June 2, 1931. F. B. THOMSON 1,808,328
CONDUIT AND PIPE CLAMP
Filed June 14, 1929
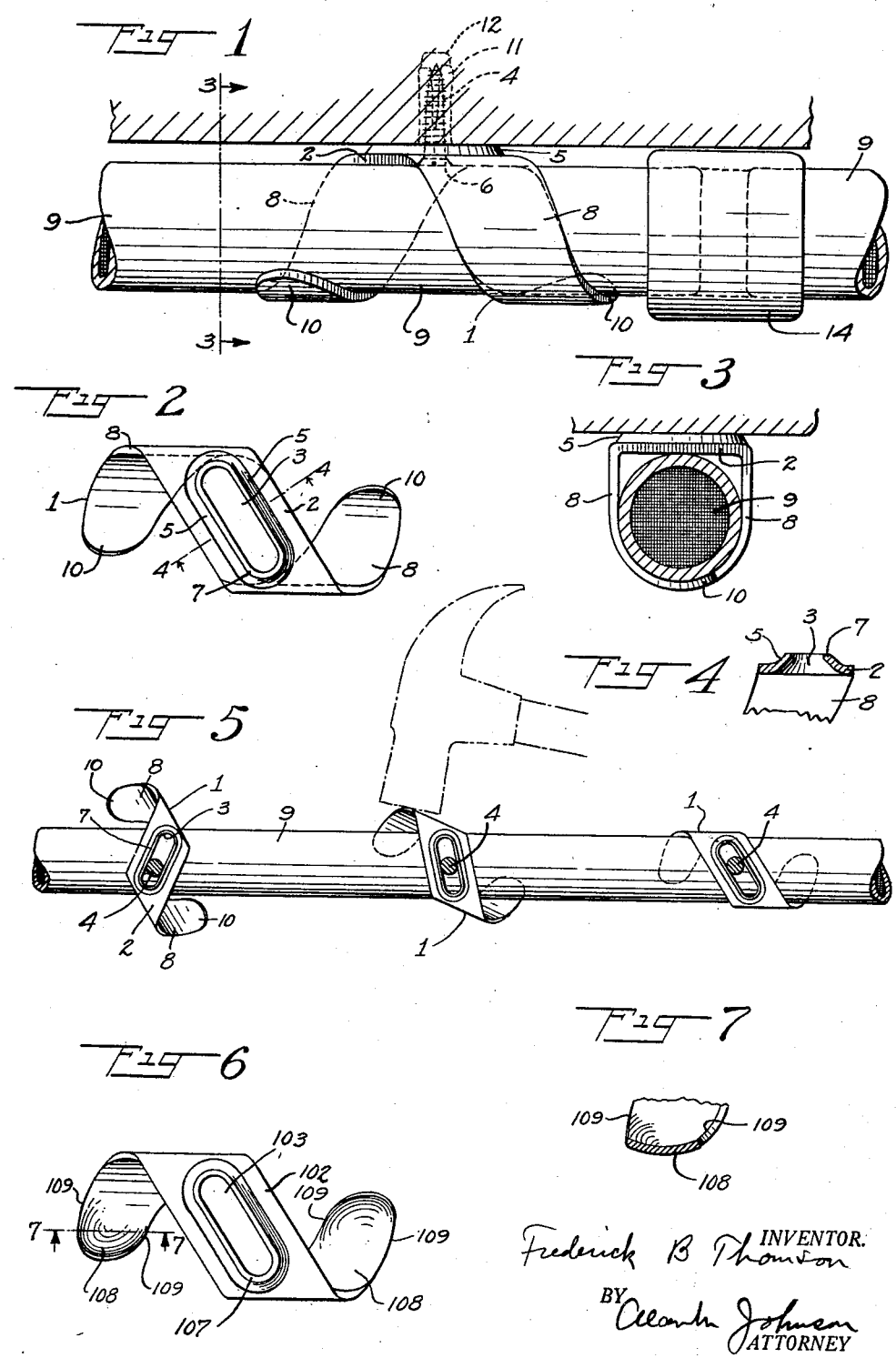

Patented June 2, 1931

1,808,328

UNITED STATES PATENT OFFICE

FREDERICK B. THOMSON, OF TEANECK, NEW JERSEY

CONDUIT AND PIPE CLAMP

Application filed June 14, 1929. Serial No. 370,944.

My invention relates to the electrical art, in which conduits are employed to protect electric wires located within them, and it also relates to supporting pipes used for various purposes.

My invention further relates to certain combinations, details of construction, and articles of manufacture, which will be more fully hereinafter described and pointed out in the claim.

In the accompanying drawings the same reference numerals refer to similar parts in the several figures:

Fig. 1 is a side elevation, illustrating a conduit supported from a ceiling by my improved conduit and pipe clamp, the ceiling being in vertical section.

Fig. 2 is a perspective view of one form of my conduit and pipe clamp.

Fig. 3 is a vertical section on line 3, 3 of Fig. 1, looking in the direction of the arrows.

Fig. 4 is a detail fragmentary section on line 4, 4 of Fig. 2.

Fig. 5 is a plan view of three separate clamps, the middle one being located on the center and the other two off-center.

Fig. 6 is a perspective view of a modification.

Fig. 7 is a vertical section on line 7, 7 of Fig. 6.

Prior to my invention it has been old to support pipe by two supporting rigid fingers which were spaced apart from each other a distance as great as the diameter of the pipe to be held, so that the pipe and hanger could be engaged or disengaged from each other, simply by rotating the hanger with relation to the pipe.

Such a hanger supported the pipe without gripping or holding it against its own vibration, or that of the ceiling or wall of the building or other support. Moreover, such a hanger was essentially a ceiling hanger. When attempting to use such a hanger on a side wall, to support a vertical run of pipe, the pipe would slip down through the hanger, throwing all the weight of the pipe on some coupling or connection instead of distributing the load through the several pipe hangers. In other words, when used on a side wall, such a hanger was a guide for the pipe rather than a support; and, further, did not prevent rattling or relative movement between the pipe and the hanger. Such a hanger was also objectionable in that it required a plurality of holes for the affixing members to be off to the side of the pipe, and not in line with the pipe, and did not permit adjustment of a clamp to compensate for faulty location of the holes in the support, due to careless workmanship, or to a drill meeting an obstruction in the wall or ceiling, or other support.

My improved conduit and cable clamp 1 overcomes all these objections and permits a quicker and more economical installation.

In the form of my invention shown in Figs. 1 to 5 inclusive, I form my conduit and pipe clamp 1 of heavy sheet metal shaped in proper dies. The base 2 is preferably rectangular and is provided with an adjusting slot 3 through which extends the supporting member 4 which may be a screw, Fig. 1, or other member. This slot 3 is preferably provided with bevel sides 5 to receive the head 6 of the wood screw 4, the screw preferably, though not necessarily, co-operating with a ductile anchor 11, or other expansion. The bevel 5 is preferably formed by swaging and pressing out the metal at the back of the base 2, forming an elongated convex ring 7, to be hereinafter referred to.

At either end of the base 2 the metal is bent up on a line substantially 45 degrees to the slot 3, forming two spring tension members 8, 8. The distance between these tension members 8, 8 is less than the diameter of the conduit or pipe 9 to be held. This requires that the ends 10, 10 of the spring tension members 8, 8 have to be sprung, by the blows of a hammer, or otherwise, over the crown of the conduit or pipe 9. This insures that the conduit or pipe 9 will be firmly and positively gripped or held by the spring tension members 8, 8 preventing rattling, or any relative movement between the hanger and the conduit or pipe. It also permits my clamp to be used on a side wall to support vertical runs of conduit or pipe, each clamp assisting in carrying the load and transmitting it, to the wall.

Drilling holes 12 into concrete, masonry, brick, or steel to attach clamps, usually by means of an expansion, such as a ductile anchor 11, Fig. 1, or other expansion, is very expensive. For the old forms of hangers the hole had to be drilled accurately for location, as there was no means provided for adjustment, if one or more holes proved to be out of line. Moreover, if the fastening means employed was not in line with the pipe or conduit, exact measurements had to be taken requiring a great deal of time.

In my invention the holes 12 are drilled exactly on the line where the pipe or conduit 9 is to be located. If through a slight error, or poor workmanship, or due to some obstruction, the hole 12 is a little off the line that the pipe or conduit is to follow, the slot 3 in the base 2 of the clamp allows for automatic adjustment to compensate for the error.

I have shown this more clearly in Fig. 5 where the center hole, as for example 12, has been accurately drilled so that the screw 4 is on center. The screw 4 of the clamp on the left of said figure, however, is on one side of the center due to faulty drilling of a hole, similar to 12, while the screw 4, on the right of Fig. 5, is on the other side of the center, due to incorrect drilling of another hole similar to hole 12. It is to be understood that in this figure three separate and distinct clamps with their respective screws 4 are illustrated.

After the holes 12, 12 are drilled and the clamps 1 held in open position by the respective screws 4, 4, the conduit or pipe 9 is brought into its predetermined position on the ceiling or wall and between the spring tension members 8, 8. The initial position in locating the conduit is shown on the left of Fig. 5. The clamp is then rotated clockwise a quarter of a revolution, and the ends 10, 10 sprung over the crown of the conduit or pipe 9 as shown initially in the middle of Fig. 5, and completed in the clamp illustrated on the right of said figure.

It is to be understood that the conduit or pipe illustrated in Fig. 5 is supported from the ceiling, and that this view is looking down upon the pipe, so that in Fig. 5 the clamp is shown rotated counter-clockwise, whereas looking up at the pipe, the clamp would be rotated clockwise, as described in the preceding paragraph.

The pipe and conduit 9 are manufactured in certain lengths; usually, at the present time, the conduit is manufactured in 10-foot lengths and the pipe in 18 foot lengths, though, of course, this may be varied, the lengths of the pipe or conduit forming no part of my invention. The sections of the conduit or pipe are secured together by couplings 14, Fig. 1.

Prior to my invention it was customary to bend the runs of conduits or pipe to compensate for the thickness of the couplings 14.

By my invention the elongated convex ring 7, plus the thickness of the base 2 of my clamp 1, is preferably, though not necessarily, the same thickness as the different couplings 14, 14 which permits the runs of conduits or pipe to extend in a straight line, rather than in an undulating one as heretofore.

I have shown a modification of my invention in Figs. 6 and 7 in which the base 102, slot 103, and elongated ring 107, are the same as the corresponding parts in the other form.

The yielding tension members 108, 108, are, in this form dished. This gives an increased grip of the tension members 108, 108 upon the conduit or pipe 9 due to the edges 109, 109 biting into, or tending to bite into, the pipe or conduit. This is particularly advantageous in vertical runs of pipe or conduit, on side walls, and materially increases the grip of the tension members on the pipe or conduit.

Should it ever be desirable to take down the run of pipe or conduit, all that is necessary, in either form illustrated, is to force the ends of the tension members 8 or 108 over the crown of the pipe or conduit and then give the clamp a quarter revolution counter-clockwise, bringing it into the position of the clamp on the left of Fig. 5. This will free the pipe or conduit and permits its removal.

Having thus described this invention in connection with illustrative embodiments thereof, to the details of which I do not desire to be limited, what is claimed as new and what is desired to secure by Letters Patent is set forth in the appended claim.

What I claim is:

A new article of manufacture, comprising a conduit or pipe clamp having a base, spring tension members, adapted to be sprung over the crown of the conduit or pipe, the ends of said spring tension members being dished to form side gripping edges to positively grip a conduit or pipe.

FREDERICK B. THOMSON.